US012456248B2

United States Patent
Mao et al.

(10) Patent No.: US 12,456,248 B2
(45) Date of Patent: Oct. 28, 2025

(54) TEMPLATE-BASED AR FACIAL AUGMENTATION

(71) Applicant: Niantic Spatial, Inc, San Francisco, CA (US)

(72) Inventors: Joshua Aisheng Mao, Mountain View, CA (US); Nathan Waters, San Francisco, CA (US); Rigel Gareth Benton, Mountain View, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 146 days.

(21) Appl. No.: 18/531,612

(22) Filed: Dec. 6, 2023

(65) Prior Publication Data

US 2025/0191272 A1   Jun. 12, 2025

(51) Int. Cl.
*G06T 15/04*  (2011.01)
*G06T 17/20*  (2006.01)
*G06T 19/00*  (2011.01)

(52) U.S. Cl.
CPC .............. *G06T 15/04* (2013.01); *G06T 17/20* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2015/0310673 A1 | 10/2015 | Romdhani et al. | |
| 2019/0045157 A1* | 2/2019 | Venshtain | G06F 3/04815 |
| 2020/0364937 A1* | 11/2020 | Selbrede | G06T 19/20 |
| 2021/0390789 A1* | 12/2021 | Liu | G06V 40/161 |
| 2023/0100427 A1 | 3/2023 | He et al. | |
| 2023/0260229 A1 | 8/2023 | Singh et al. | |

FOREIGN PATENT DOCUMENTS

| | | |
|---|---|---|
| KR | 10-2002-0024412 A | 3/2002 |
| KR | 10-2023-0065037 A | 5/2023 |

OTHER PUBLICATIONS

PCT International Search Report and Written Opinion, PCT Application No. PCT/US2024/025467, Aug. 29, 2024, nine pages.

* cited by examiner

*Primary Examiner* — Tapas Mazumder
(74) *Attorney, Agent, or Firm* — Fenwick & West LLP

(57) ABSTRACT

The present disclosure describes an online system that applies template-based facial augmentations to images as part of an augmented reality experience. A facial augmentation template is a template for an augmented reality (AR) modification to apply to a user's face. These templates include a structure for how the augmentation should be applied to the face and display parameters that a user can set for how the templates should be rendered (e.g., color, specularity, or opacity). The online system identifies feature points on a 3D model of the user's face that correspond to features on the user's actual face, and localizes the template relative to the 3D model by mapping anchor points of the template to corresponding feature points on the 3D model. The online system renders the facial augmentation template at the localization to generate an augmented image of the user's face.

20 Claims, 4 Drawing Sheets

TEMPLATE-BASED AR FACIAL AUGMENTATION

BACKGROUND

1. Technical Field

The subject matter described relates generally to augmented reality and, in particular, to applying template-based facial augmentations to images as part of an augmented reality experience.

2. Problem

Augmented reality is a process whereby a computer system superimposes a computer-generated image on a user's view of the world in a manner that makes the computer-generated content appear to actually exist within the real world. Augmented reality content is generally pre-generated content, meaning that the structure and display characteristics of the content is predetermined. This pre-generated content is localized within a virtual representation of the physical world, and the pre-generated content is rendered as an overlay on an image or video of the real world. However, pre-generated content is limited in its ability for users to adjust the augmented reality content in real time. For example, a system that provides adjustable augmented reality content using pre-generated content must limit the options for content that are made available to a user or must pre-generate many different alternatives for a user so that the user can have a wide range of choices. Thus, systems that provide augmented reality content are generally limited in the content that they can provide to users.

SUMMARY

The present disclosure describes an online system that applies template-based facial augmentations to images as part of an augmented reality experience. A facial augmentation template is a template for an augmented reality (AR) modification to apply to a user's face. These templates include a structure for how the augmentation should be applied to the face and display parameters that a user can set for how the templates should be rendered (e.g., color, specularity, or opacity). The online system identifies feature points on a 3D model of the user's face that correspond to features on the user's actual face, and localizes the template relative to the 3D model by mapping anchor points of the template to corresponding feature points on the 3D model. The online system renders the facial augmentation template at the localization to generate an augmented image of the user's face.

By using a facial augmentation template, a user can dynamically change the display parameters for the template to change how the facial augmentation template is rendered. For example, the client device may provide a user interface that displays the augmented image of the user and user interface elements for selecting a set of display parameters for the facial augmentation template. The user may select updated display parameters using the user interface elements and the online system automatically updates the augmented image with one rendered according to the updated display parameters. In some embodiments, the client device uses a camera to capture a video feed of the user's face and augments frames of the video feed to include the facial augmentation. The client device may display the augmented video feed through the user interface and update the rendering of the facial augmentation template as the client device receives updated display parameters through the user interface elements of the user interface.

In one embodiment, an online system performs a method comprising: accessing an image depicting a face of a user; generating a 3D face model for the face based on the image, wherein the 3D face model represents a 3D structure of the face; identifying a set of feature points on the 3D face model, wherein each feature point corresponds to a facial feature of the face of the user; mapping a set of anchor points of a facial augmentation template to the facial features, wherein the facial augmentation template describes a structure of an augmentation to a depiction of the face of the user; receiving a set of display parameters for the facial augmentation template from a client device, wherein the set of display parameters are parameters for rendering the facial augmentation template; rendering an augmented image based on the display parameters and the facial augmentation template; and causing a client device to display the augmented image.

DETAILED DESCRIPTION

The figures and the following description describe certain embodiments by way of illustration only. One skilled in the art will recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Online System

Figure 1:
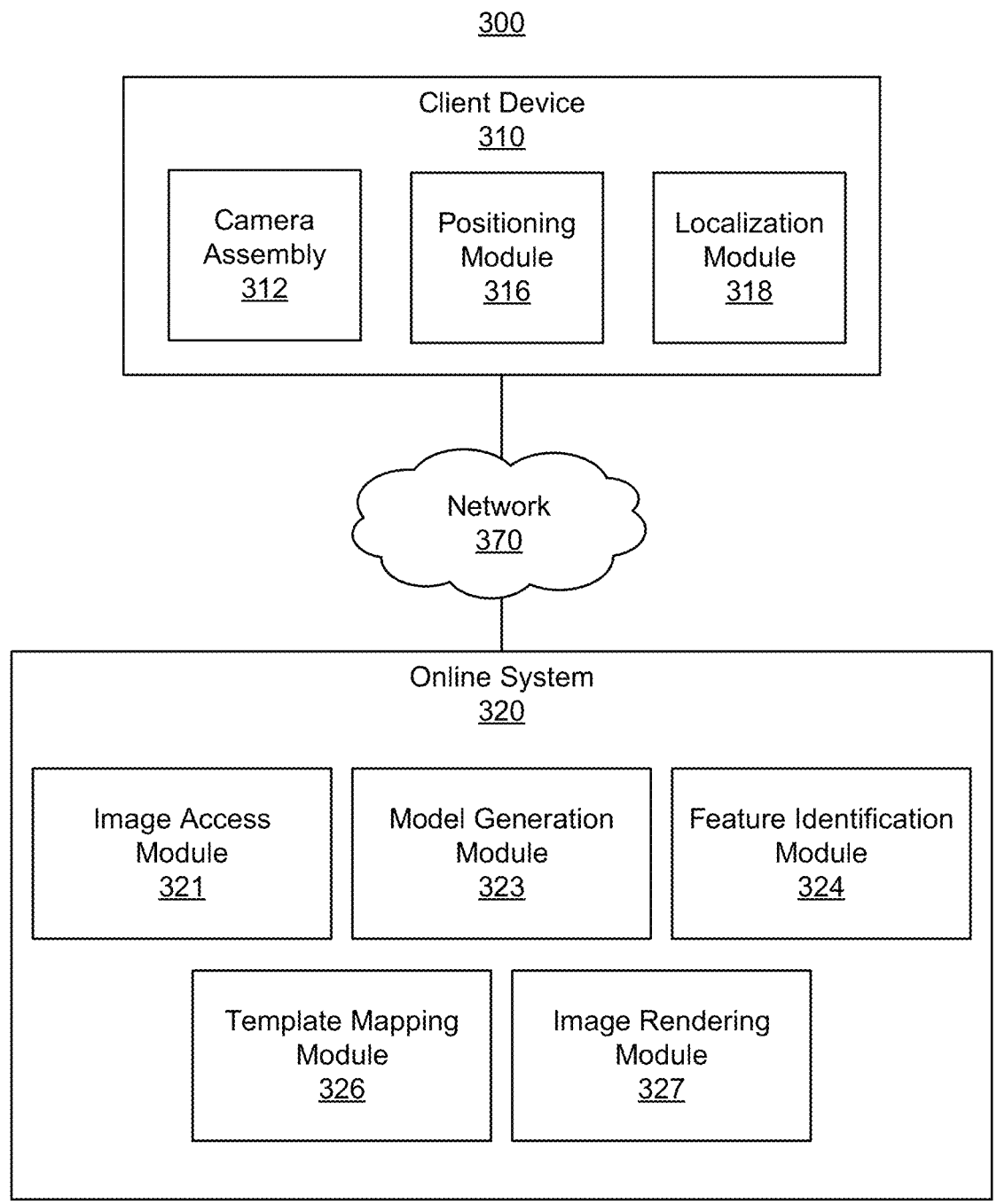
FIG. 1 illustrates one embodiment of a networked computing environment 300, according to one embodiment.

FIG. 1 illustrates one embodiment of a networked computing environment 300 for an online system. The networked computing environment 300 uses a client-server architecture, where an online system 320 communicates with a client device 310 over a network 370 to provide services to a user at the client device 310. The networked computing environment 300 also may include other external systems such as sponsor/advertiser systems or business systems. Although only one client device 310 is shown in FIG. 1, any number of client devices 310 or other external systems may be connected to the online system 320 over the network 370. Furthermore, the networked computing environment 300 may contain different or additional elements and functionality may be distributed between the client device 310 and the online system 320 in different manners than described below.

A client device 310 can be any portable computing device capable for use by a user to interface with the online system 320. For instance, a client device 310 is preferably a portable wireless device that can be carried by a user, such as a smartphone, portable gaming device, augmented reality (AR) headset, cellular phone, tablet, personal digital assistant (PDA), navigation system, handheld GPS system, or other such device. For some use cases, the client device 310 may be a less-mobile device such as a desktop or a laptop computer. Furthermore, the client device 310 may be a vehicle with a built-in computing device.

The client device 310 communicates with the online system 320 to provide sensory data of a physical environment. In one embodiment, the client device 310 includes a camera assembly 312, positioning module 316, and localization module 318. The client device 310 also includes a network interface (not shown) for providing communications over the network 370. In various embodiments, the client device 310 may include different or additional components, such as additional sensors, display, and software modules, etc.

The camera assembly 312 includes one or more cameras that can capture image data. The cameras capture image data describing a scene of the environment surrounding the client device 310 with a particular pose (the location and orientation of the camera within the environment). The camera assembly 312 may use a variety of photo sensors with varying color capture ranges and varying capture rates. Similarly, the camera assembly 312 may include cameras with a range of different lenses, such as a wide-angle lens or a telephoto lens. The camera assembly 312 may be configured to capture single images or multiple images as frames of a video. The camera assembly 312 may include a front-facing camera or a rear-facing camera (e.g., a "selfie" camera).

The client device 310 may also include additional sensors for collecting data regarding the environment surrounding the client device, such as movement sensors, accelerometers, gyroscopes, barometers, thermometers, light sensors, microphones, etc. The image data captured by the camera assembly 312 can be appended with metadata describing other information about the image data, such as additional sensory data (e.g. temperature, brightness of environment, air pressure, location, pose etc.) or capture data (e.g. exposure length, shutter speed, focal length, capture time, etc.).

The positioning module 316 can be any device or circuitry for determining the position of the client device 310. For example, the positioning module 316 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, IP address analysis, triangulation and/or proximity to cellular towers or Wi-Fi hotspots, or other suitable techniques.

The localization module 318 provides an additional or alternative way to determine the location of the client device 310. In one embodiment, the localization module 318 receives the location determined for the client device 310 by the positioning module 316 and refines it by determining a pose of one or more cameras of the camera assembly 312. The localization module 318 may use the location generated by the positioning module 316 to select a 3D map of the environment surrounding the client device 310 and localize against the 3D map. The localization module 318 may obtain the 3D map from local storage or from the online system 320. The 3D map may be a point cloud, mesh, or any other suitable 3D representation of the environment surrounding the client device 310. Alternatively, the localization module 318 may determine a location or pose of the client device 310 without reference to a coarse location (such as one provided by a GPS system), such as by determining the relative location of the client device 310 to another device.

In one embodiment, the localization module 318 applies a trained model to determine the pose of images captured by the camera assembly 312 relative to the 3D map. Thus, the localization model can determine an accurate (e.g., to within a few centimeters and degrees) determination of the position and orientation of the client device 310. The position of the client device 310 can then be tracked over time using dead reckoning based on sensor readings, periodic re-localization, or a combination of both.

The online system 320 includes one or more computing devices that provide template-based AR facial augmentation for the client device 310. The online system 320 includes an image access module 321, a model generation module 323, a feature identification module 324, a template mapping module 326, and an image rendering module 327.

The online system 320 generates augmented versions of images of a user's face based on facial augmentation templates. The online system 320 receives images from client devices (e.g., as frames of a video captured by the client devices) and generates 3D models of user faces based on the received images. The online system 320 augments the images based on facial augmentation templates and transmits the augmented images for display to users through client devices. The online system 320 also provides user interfaces to client devices for selecting display parameters for facial augmentation templates for updating how facial augmentation templates are rendered in real-time.

In the embodiment shown in FIG. 1, the online system 320 includes an image access module 321, a model generation module 323, a feature identification module 324, a template mapping module 326, and an image rendering module 327. In other embodiments, the online system 320 contains different or additional elements. In addition, the functions may be distributed among the elements in a different manner than described.

The image access module 321 accesses images that depict faces of users of the online system 320. The online system may receive the images from client devices that captured the images and store them in a database of images. In some embodiments, the images are frames in videos captured by client devices, and the image access module 321 stores the videos in a database.

The model generation module 323 generates 3D face models of user faces based on accessed images. A 3D face model is a model that represents a 3D structure of the user's face. For example, the 3D face model may be a mesh of polygons that represent the structure of the user's face. Alternatively, the 3D face model may be a point cloud that represents the surface of the user's face. The model generation module 323 may generate the 3D face model by applying computer-vision techniques to the accessed image.

The feature identification module 324 identifies 420 feature points on 3D face models. Feature points are reference points on 3D face models that correspond to features on the user's actual face. For example, feature points may indicate the location of body parts (e.g., eyes, ears, nose) or may indicate locations on the 3D face model with respect to body parts (e.g., bottom-most point on ear lobe or left-corner of left eye). The feature identification module 324 may identify the feature points by applying a machine-learning model to 3D face models and the image. This machine-learning model may be a different machine-learning model from a model that generates the 3D face model. Alternatively, the machine-learning model that generates the 3D face model may also generate feature points for the 3D face model.

The template mapping module 326 maps anchor points of facial augmentation templates to identified feature points of 3D face models. A facial augmentation template's anchor points are reference points on the facial augmentation template to be mapped to feature points so that the facial augmentation template is correctly located relative to a 3D face model. For example, a facial augmentation template for lipstick may have anchor points that map onto feature points on and around the user's lips so that the template is located near the portion of the 3D face model that corresponds to user' slips. In some embodiments, the template mapping module 326 transforms the structure of facial augmentation templates so that the template's anchor points line up with the appropriate feature points on 3D face models. For example, the template mapping module 326 may stretch a lipstick facial augmentation template to match the width and height of a user's mouth based on the locations of the corresponding feature points on the 3D model.

The image rendering module 327 renders 450 an augmented version of an image based on a facial augmentation template and display parameters for the facial augmentation template. The image rendering module 327 generally only renders the facial augmentation template so that the facial augmentation template appears to be an actual augmentation of the user's face. Additionally, the image rendering module 327 renders the facial augmentation template such that the facial augmentation template appears to be located at an intended position relative to the user's face. For example, the image rendering module 327 may determine a camera position of the camera that captured the original image relative to the 3D face model. The online system may then determine a location and orientation of the facial augmentation template (e.g., by mapping anchor points), and renders the facial augmentation template to generate the augmented image.

This disclosure makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes disclosed as being implemented by a server may be implemented using a single server or multiple servers working in combination. Databases and applications may be implemented on a single system or distributed across multiple systems. Distributed components may operate sequentially or in parallel.

In situations in which the systems and methods disclosed access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Example Methods of Template-Based Facial Augmentation

Figure 2:
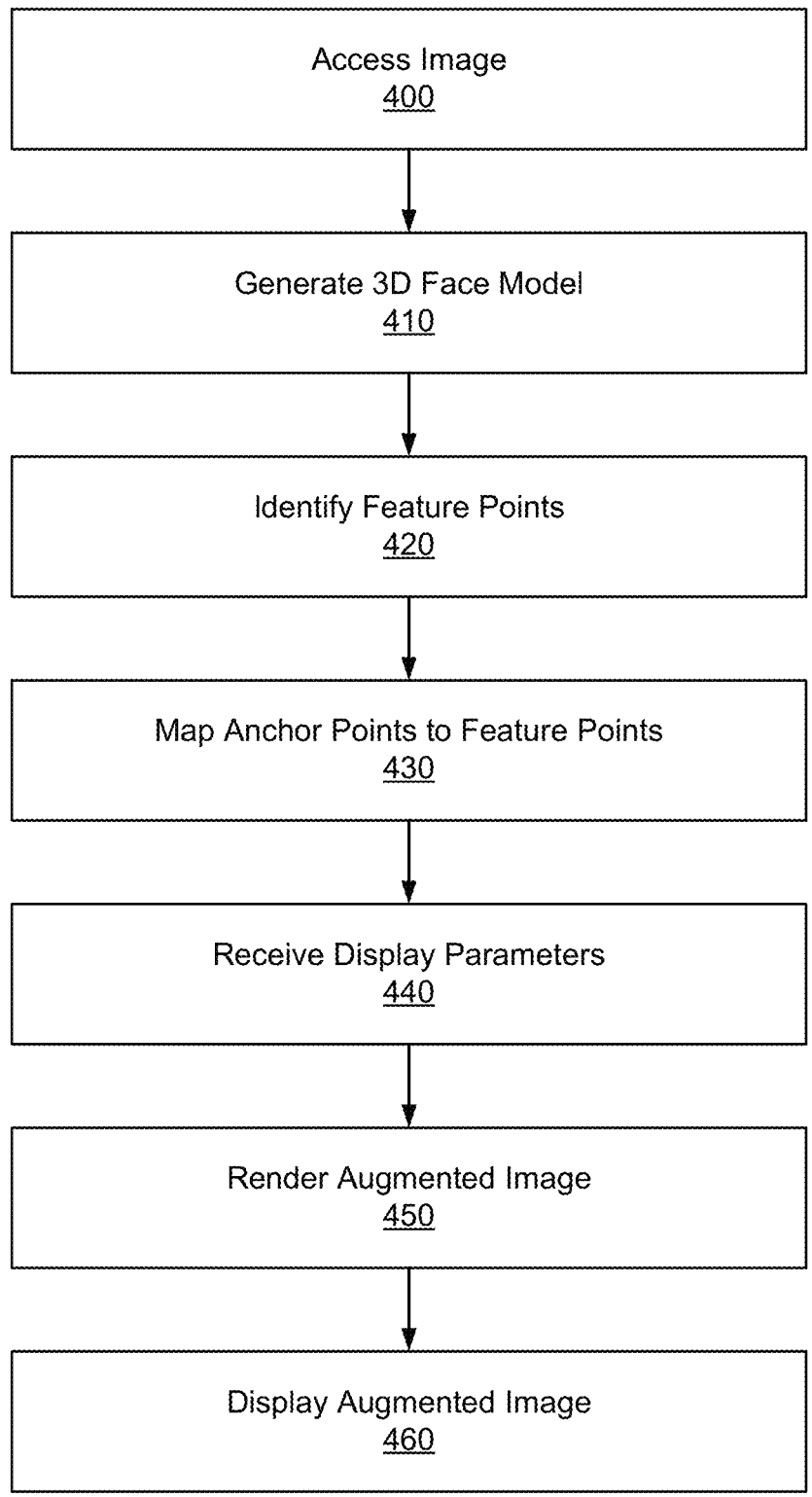
FIG. 2 is a flowchart describing an example method of template-based facial augmentation, according to one embodiment.

FIG. 2 is a flowchart describing an example method of template-based facial augmentation, according to one embodiment. The steps of FIG. 2 are illustrated from the perspective of an online system (e.g., the online system 320) performing the method. However, some or all of the steps may be performed by other entities or components, such as a client device (e.g., client device 310). In addition, some embodiments may perform the steps in parallel, perform the steps in different orders, or perform different steps An online system accesses 400 an image depicting the face of a user. The online system may receive the image from a client device that captured the image, or may access the image from a database of images. In some embodiments, the image is a frame of a video captured by the client device.

The online system generates 410 a 3D face model of the user's face based on the accessed image. A 3D face model is a model that represents a 3D structure of the user's face. For example, the 3D face model may be a mesh of polygons that represent the structure of the user's face. In these examples, the online system may generate the mesh of polygons by generating a set of vertices and creating the 3D face model using the set of vertices. Alternatively, the 3D face model may be a point cloud that represents the surface of the user's face.

The online system generates the 3D face model by applying computer-vision techniques to the accessed image. For example, the online system may apply a computer-vision machine-learning model to the accessed image. This computer-vision machine-learning model is trained to generate 3D face models of users' faces based on images of their faces. In some embodiments, in addition to using the accessed image, the online system also uses sensor data captured by the user's client device to generate the 3D face model. For example, the client device may capture an infrared point cloud of the user's face and may use that point cloud to generate the 3D face model. Where the online system uses a machine-learning model to generate the 3D face model, the machine-learning model may take sensor data as an input to generate a 3D face model.

The online system uses the 3D face model to apply a facial augmentation template to generate an augmented version of the user's face. A facial augmentation template is a template for an AR modification to apply to a user's face. The facial augmentation template includes a structure for how the augmentation should be applied to the face. For example, a facial augmentation template may represent make-up to be applied to a user's face, and the structure of the facial augmentation template represents where on the user's face the make-up would be applied. Similarly, a facial augmentation template for extending, reducing, or otherwise modifying a user's face may include a structure for the extension, reduction, or modification. A facial augmentation template may include a mesh of polygons that represent the structure of the facial augmentation. Alternatively, the facial augmentation template specifies a portion of the 3D face model whose appearance should be modified based on display parameters of the facial augmentation template. For example, the facial augmentation template may include an alpha map to specify which portion of the 3D face model should be modified.

In some embodiments, the online system provides a library of facial augmentation templates from which a user can select for augmenting images of their faces. The online system may receive a selection of a facial augmentation template from the user through a client application or through a web browser operating on the user's client device. The facial augmentation templates stored by the online system may be generated by the online system or may be received by the online system from third-party systems to be made available to users of the online system.

The online system identifies a pose for the facial augmentation template relative to the 3D face model by identifying 420 feature points on the 3D face model. Feature points are reference points on the 3D face model that correspond to features on the user's actual face. For example, feature points may indicate the location of body parts (e.g., eyes, ears, nose) or may indicate locations on the 3D face model with respect to body parts (e.g., bottom-most point on ear lobe or left-corner of left eye). In embodiments where the 3D face model is generated on top of a set of vertices, the feature points may be a subset of the set of vertices. The online system may identify the feature points by applying a machine-learning model to the 3D face model and the image. This machine-learning model may be a different machine-learning model from a model that generates the 3D face model. Alternatively, the machine-learning model that generates the 3D face model may also generate feature points for the 3D face model. For example, the machine-learning model that generates the 3D face model may generate a set of vertices for the 3D face model and may identify which of those vertices correspond to feature points.

The online system maps 430 anchor points of the facial augmentation template to identified feature points of the 3D face model. A facial augmentation template's anchor points are reference points on the facial augmentation template to be mapped to feature points so that the facial augmentation template is correctly located relative to the 3D face model. For example, a facial augmentation template for lipstick may have anchor points that map onto feature points on and around the user's lips so that the template is located near the portion of the 3D face model that corresponds to user' slips. In some embodiments, the online system transforms the structure of the facial augmentation template so that the template's anchor points line up with the appropriate feature points on the 3D face model. For example, the online system may stretch the lipstick facial augmentation template to match the width and height of the user's mouth based on the locations of the corresponding feature points on the 3D model.

Figure 3:
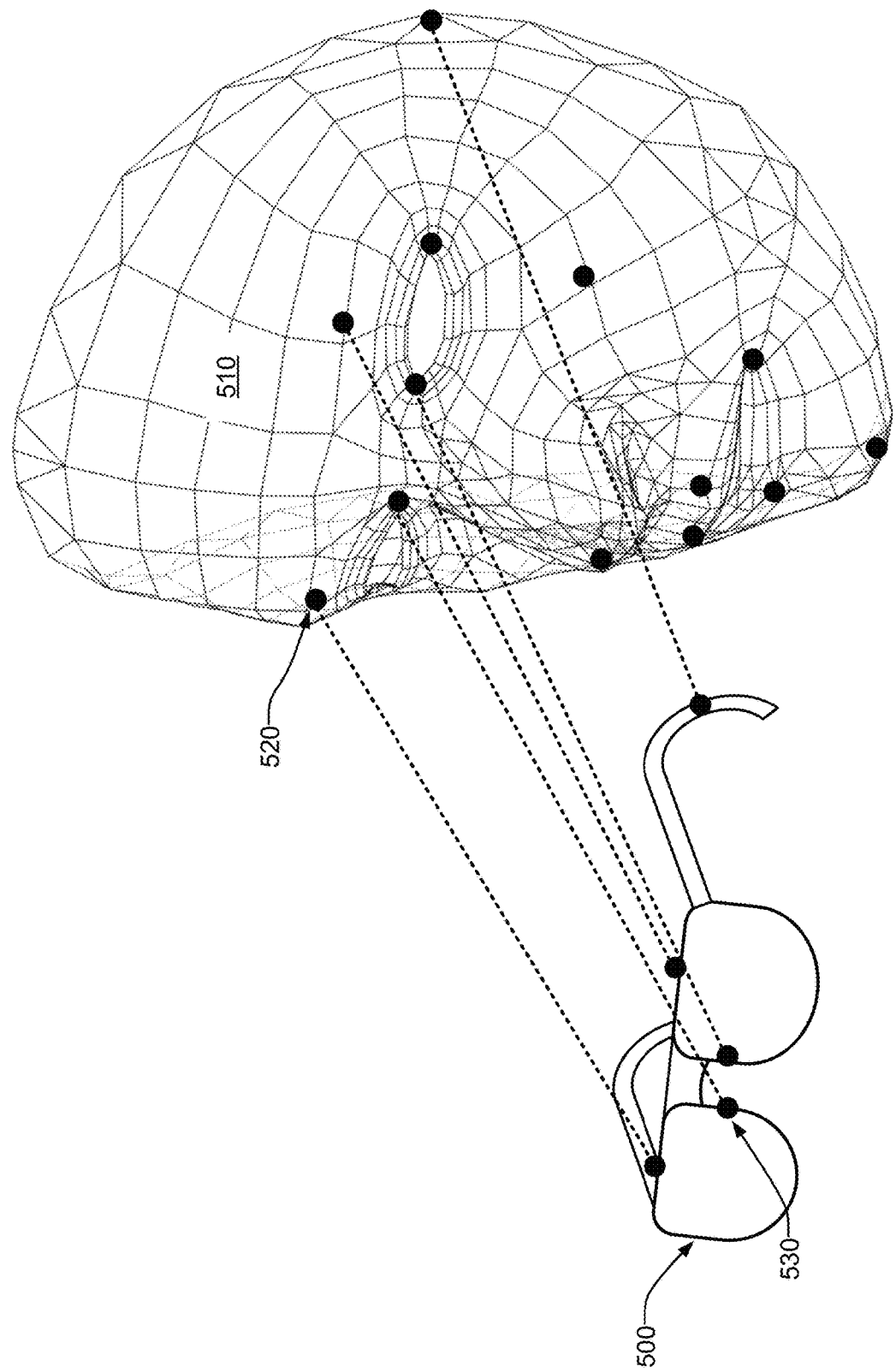
FIG. 3 illustrates an example facial augmentation template being mapped onto a 3D face model of a user, according to one embodiment.

FIG. 3 illustrates an example facial augmentation template 500 being mapped onto a 3D face model 510 of a use, in accordance with some embodiments. In FIG. 3, a facial augmentation template 500 that is structured like sunglasses such that an augmented image based on the template 500 would make the user appear to be wearing the sunglasses. As described above, the online system identifies feature points 520 on the 3D face model 510 that correspond to facial features of the user's face. The online system maps anchor points 530 on the facial augmentation template 500 to corresponding feature points 520 on the 3D face model 510 and localizes the facial augmentation template 500 relative to the 3D face model based on the mapping.

The online system receives 440 display parameters for the facial augmentation template. Display parameters are parameters for rendering the facial augmentation template that may not impact the structure of the template. For example, the display parameters for a facial augmentation template may include color, specularity, roughness, opacity, emission, shading, tileable, displacement, or metalness. In some embodiments, the display parameters are parameters for a texture that is applied to the facial augmentation template.

The online system renders 450 an augmented version of the image based on the facial augmentation template and the display parameters for the facial augmentation template. The online system generally only renders the facial augmentation template so that the facial augmentation template appears to be an actual augmentation of the user's face. Additionally, the online system renders the facial augmentation template such that the facial augmentation template appears to be located at an intended position relative to the user's face. For example, the online system may determine a camera position of the camera that captured the original image relative to the 3D face model. The online system may then determine a location and orientation of the facial augmentation template (e.g., by mapping anchor points), and renders the facial augmentation template to generate the augmented image.

The online system displays 460 the augmented image to the user through a user interface on the client device. The user interface may be a user interface for a client application operating on the client device or may be part of web browser accessing a web page associated with the online system. In some embodiments, the user interface displaying the augmented image also displays UI elements for selecting display parameters for the facial augmentation template. In these embodiments, the user may select new display parameters for the facial augmentation template using the UI elements and the online system may update the displayed image to be a new augmented image that is rendered based on the new display parameters.

As noted above, the received image may be a frame in a video feed from the client device, and the online system may apply the described process to generate an augmented version of each of a set of frames from that video feed. In these embodiments, the user interface of the client device may display the augmented frames to the user as an augmented version of the video feed. The user interface displaying the augmented video feed may include UI elements for selecting display parameters for the facial augmentation template. In some embodiments, the user interface further includes UI elements for selecting facial augmentation templates to apply to the video feed.

Figure 4:
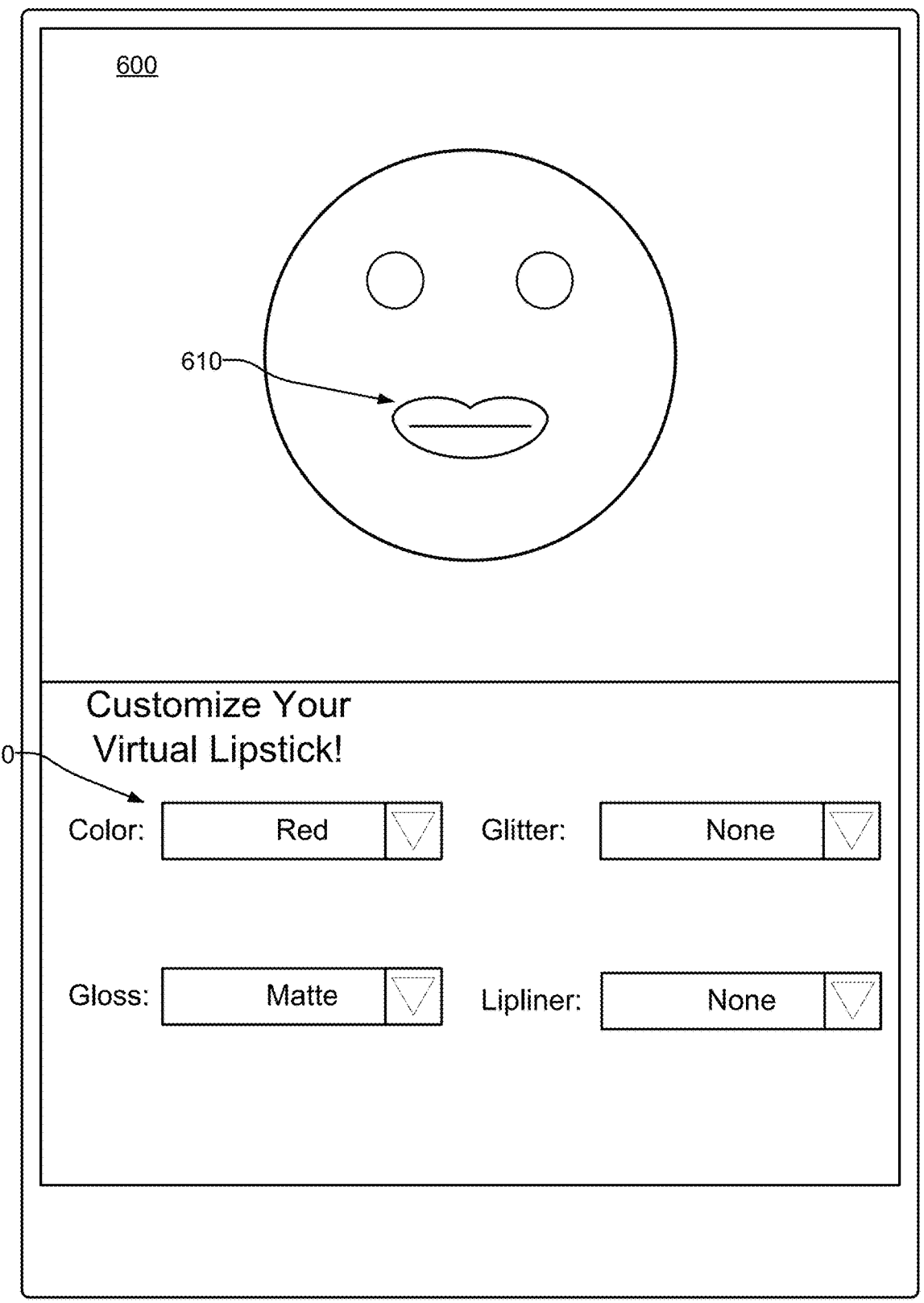
FIG. 4 illustrates an example user interface whereby a user can select display parameters for a facial augmentation template, according to one embodiment.

FIG. 4 illustrates an example user interface whereby a user can select display parameters for a facial augmentation template, in accordance with some embodiments. The user interface includes an augmented image 600 that includes the rendered facial augmentation template 610. In FIG. 4, the facial augmentation template represents lipstick that a user can virtually try on their face. The user interface includes several UI elements 620 that a user can interact with to select display parameters for the facial augmentation template. In FIG. 4, the user can select a color of the lipstick, how glossy the lipstick should be, whether the lipstick includes glitter, and whether to include lipliner around the lipstick.

While the description herein may primarily focus on facial augmentations, similar approaches may be taken with regards to augmentations to be applied to other parts of a user's body or generally to any object depicted in an image. For example, the online system may generate a 3D model of an object depicted in an image and identify feature points on that object. The online system then maps anchor points of an augmentation template to feature points on the object and renders an augmented image of the object based on the augmentation template.

Additional Considerations

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing the described functionality. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:
    accessing an image depicting a face of a user;
    generating a 3D face model for the face based on the image, wherein the 3D face model represents a 3D structure of the face;
    identifying a set of feature points on the 3D face model, wherein each feature point corresponds to a facial feature of the face of the user;
    mapping a set of anchor points of a facial augmentation template to the facial features, wherein the facial augmentation template describes a structure of an augmentation to a depiction of the face of the user;
    receiving a set of display parameters for the facial augmentation template from a client device;
    rendering an augmented image based on the display parameters and the facial augmentation template; and
    causing a client device to display the augmented image.

2. The method of claim 1, further comprising:
    generating the 3D face model based on sensor data collected by the client device.

3. The method of claim 1, wherein generating the 3D face model comprises:
    applying a machine-learning model to the image to generate the 3D face model, wherein the machine-learning model is trained to generate 3D face models based on images depicting faces.

4. The method of claim 3, wherein identifying the set of feature points comprises:
    applying the machine-learning model to the image to generate the set of feature points.

5. The method of claim 3, wherein identifying the set of feature points comprises:
    applying another machine-learning model to the image and the 3D face model, wherein the other machine-learning model is a machine-learning model that is trained to identify feature points on a 3D face model based on the 3D face model and a corresponding image.

6. The method of claim 1, wherein the image is a frame in a video feed captured by the client device.

7. The method of claim 6, further comprising:
    receiving updated display parameters from the client device;
    receiving another image depicting the face of the user, wherein the other image is another frame in the video feed;
    rendering another augmented image based on the other image, the facial augmentation template, and the updated display parameters; and
    causing the client device to display the other augmentation image.

8. The method of claim 1, wherein causing the client device to display the augmented image comprises:
    transmitting the augmented image to the client device from an online system.

9. The method of claim 1, wherein the 3D face model comprises a mesh of polygons.

10. The method of claim 1, wherein the set of display parameters comprises parameters for applying a texture to the facial augmentation template.

11. A non-transitory computer-readable medium storing instructions that, when executed by a computing system, cause the computing system to perform operations comprising:
    accessing an image depicting a face of a user;
    generating a 3D face model for the face based on the image, wherein the 3D face model represents a 3D structure of the face;
    identifying a set of feature points on the 3D face model, wherein each feature point corresponds to a facial feature of the face of the user;
    mapping a set of anchor points of a facial augmentation template to the facial features, wherein the facial augmentation template describes a structure of an augmentation to a depiction of the face of the user;
    receiving a set of display parameters for the facial augmentation template from a client device;
    rendering an augmented image based on the display parameters and the facial augmentation template; and
    causing a client device to display the augmented image.

12. The computer-readable medium of claim 11, wherein the operations further comprise:

generating the 3D face model based on sensor data collected by the client device.

13. The computer-readable medium of claim 11, wherein generating the 3D face model comprises:
applying a machine-learning model to the image to generate the 3D face model, wherein the machine-learning model is trained to generate 3D face models based on images depicting faces.

14. The computer-readable medium of claim 13, wherein identifying the set of feature points comprises:
applying the machine-learning model to the image to generate the set of feature points.

15. The computer-readable medium of claim 13, wherein identifying the set of feature points comprises:
applying another machine-learning model to the image and the 3D face model, wherein the other machine-learning model is a machine-learning model that is trained to identify feature points on a 3D face model based on the 3D face model and a corresponding image.

16. The computer-readable medium of claim 11, wherein the image is a frame in a video feed captured by the client device.

17. The computer-readable medium of claim 16, wherein the operations further comprise:
receiving updated display parameters from the client device;
receiving another image depicting the face of the user, wherein the other image is another frame in the video feed;
rendering another augmented image based on the other image, the facial augmentation template, and the updated display parameters; and
causing the client device to display the other augmentation image.

18. The computer-readable medium of claim 11, wherein causing the client device to display the augmented image comprises:
transmitting the augmented image to the client device from an online system.

19. The computer-readable medium of claim 11, wherein the 3D face model comprises a mesh of polygons.

20. The computer-readable medium of claim 11, wherein the set of display parameters comprises parameters for applying a texture to the facial augmentation template.

* * * * *